Figure 1:
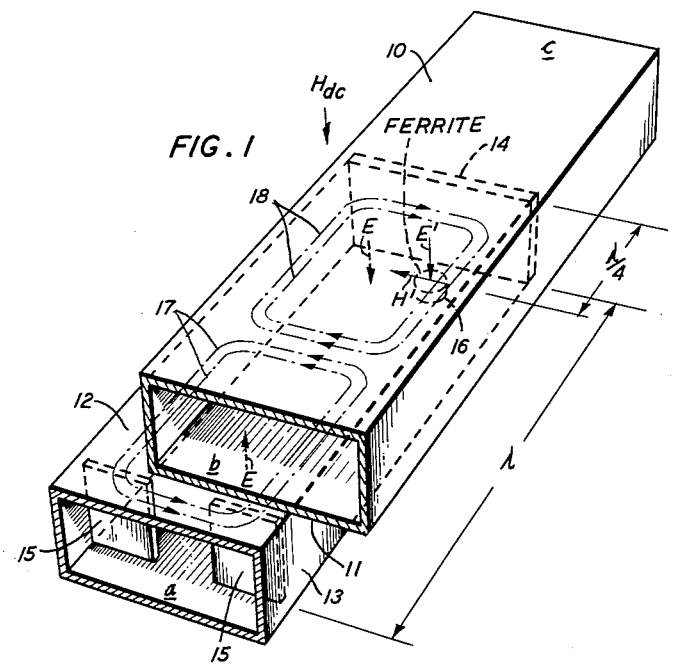

INVENTOR
E. H. TURNER
BY Roy M. Porter Jr.
ATTORNEY

United States Patent Office 2,979,675
Patented Apr. 11, 1961

2,979,675

NON-RECIPROCAL WAVE TRANSMISSION

Edward H. Turner, Red Bank, N.J., assignor to Bell Telephone Laboratories, Incorporated, New York, N.Y., a corporation of New York Filed Aug. 22, 1957, Ser. No. 679,666

3 Claims. (Cl. 333—10)

This invention relates to electrical transmission systems and, more particularly, to multibranch circuits having nonreciprocal transmission properties for use in said systems.

It is an object of the invention to establish nonreciprocal electrical connections between the branches of a three-branch network by new and simplified apparatus.

Recently, the electromagnetic transmission art has been substantially advanced by the development of a whole new group of nonreciprocal transmission components using one of the nonreciprocal properties of gyromagnetic materials such as ferrites. One of the more important of these components is a multibranch network known as a circulator circuit having the electrical property that energy is transmitted in circular fashion around the branches of the network so that energy appearing in one branch thereof is coupled to only one other branch for a given direction of transmission, but to another branch for the opposite direction of transmission. This affords a circuit component with an entirely new electrical property for which numerous applications have been proposed.

It is another object of the present invention to provide new and improved types of circulators.

It has been shown in the copending application of S. E. Miller, Serial No. 374,772, filed August 17, 1953, now U.S. Patent 2,849,687, issued August 26, 1958, and in my copending application, Serial No. 374,529, filed August 17, 1953, now U.S. Patent 2,849,686, issued August 26, 1958, that when an element of polarized gyromagnetic material is employed as the coupling means between first and second electromagnetic wave transmission structures, such as hollow conductive wave guides, it not only couples each component of the magnetic field of an initial wave from the first structure into the second, but in effect generates a new component corresponding to each initial component, at right angles to the initial component, and displaced from it by 90 degrees in time. In accordance with the present invention, these principles are utilized in a novel way by setting up a standing wave in the first structure so that the maximum of electric field coincides at the gyromagnetic coupling element with the maximum of longitudinal magnetic field. The coupling to the second structure is so arranged that in addition to the induced magnetic field therein there is also a directly coupled electrical field. The wave excited in the second structure by this electrical field is in the same phase with the component wave excited by the induced magnetic field for one direction of propagation and opposite in phase therewith for the opposite direction of propagation therein. Thus, energy from the first structure is coupled as a wave propagating in only one direction in the second structure. This coupling, however, is nonreciprocal so that energy initially excited in the second structure and traveling in a direction opposite to said one direction will be electrically and magnetically coupled as canceling component waves in the first structure. Conversely, a wave traveling in said one direction in the second structure will be electrically and magnetically coupled as in phase component waves in the first structure. This results in a three-terminal circulator circuit.

In certain aspects the structure of the present invention may be considered as an improvement upon the structure disclosed in the above-mentioned application of S. E. Miller. To this extent, a primary advantage of the preesnt circulator stems from the elimination of reactive balancing elements of relatively critical adjustment employed by Miller.

These and other objects and features, the nature of the present invention and its various advantages will appear more fully upon consideration of the various specific illustrative embodiments shown in the accompanying drawings and described in the following detailed description of these drawings.

Figure 2:
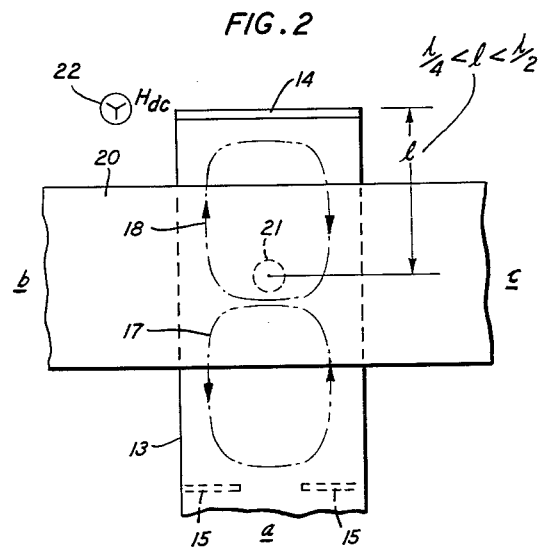

In the drawings:

Fig. 1 is a perspective view of an embodiment of the invention showing a propagating wave guide structure and a standing wave guide structure coupled by a gyromagnetic coupling element; and Fig. 2 is a diagrammatical view of a modification of Fig. 1 showing the wave guide structures in an alternative physical orientation.

Referring more specifically to Fig. 1, a nonreciprocal three-branch microwave network or three-branch circulator circuit is shown as an illustrative embodiment of the present invention. This network comprises a first section 10 of conductively bounded electrical transmission line for guiding wave energy which may be a rectangular wave guide of the metallic shielded type having a wide internal cross-sectional dimension of at least one-half wavelength of the energy to be conducted thereby and a narrow dimension substantially one-half of the wide dimension. A second rectangular wave guide 13, substantially identical to guide 10, is located contiguous and parallel to guide 10 with its wide wall 12 adjacent the wide wall 11 of guide 10. The wide wall 12 of guide 13, according to the preferred embodiment of the invention, is slightly off centered on wall 11 of guide 10 for the reasons to be noted hereinafter.

The back end of guide 13 is terminated in a completely reflecting conductive piston 14. Located substantially one guide wavelength of the band to be coupled in front of piston 14 is a microwave iris 15. The left and right ends of guide 10 are labeled terminals $b$ and $c$ respectively, and the forward end of guide 13 is labeled terminal $a$.

Guides 10 and 13 are electromagnetically coupled by a polarized gyromagnetic coupling element which may be, as illustrated, an aperture extending through walls 11 and 12 which is filled by a plug-like disc of gyromagnetic material 16. This aperture is displaced to one side of the longitudinal center line of wall 12 of guide 13 by a distance to be defined more precisely hereinafter and is spaced from conductive piston 14 by substantially one-quarter wavelength. As noted above, guide 10 is displaced on wall 12 so that in a preferred embodiment of the invention, the wall 11 of guide 10 may be centered upon element 16.

Disc 16 has a thickness substantially equal to the combined thickness of walls 11 and 12 and a diameter which is small compared to one wavelength. For example, the diameter of disc 15 may be in the order of three-quarters of the narrow guide wall dimension. The thickness of disc 16 may be substantially increased, however, and may advantageously take the form of a probe or post extending a substantial distance into both guides 10 and 13. Alternatively, the gyromagnetic material may be a wafer-like member placed next to the inside of either wall and covering the aperture.

As a specific example of a gyromagnetic medium, disc 16 may be made of any of the several ferromagnetic materials combined in a spinel structure. For example, disc 16 may comprise an iron oxide with a small quantity of one or more bivalent metals such as nickel, magnesium, zinc, manganese or other similar material, in which the other materials are combined with the iron oxide in a spinel structure. This material is known as a ferromagnetic spinel or a ferrite. As a specific example, disc 15 may be made of nickel-zinc ferrite prepared in the manner described in the publication of C. L. Hogan, "The Microwave Gyrator," in the Bell System Technical Journal, January 1952, or in his Patent 2,748,353, granted May 29, 1956.

Disc 16 is biased by a steady polarizing magnetic field, of a strength to be described, indicated schematically by the vector $H_{dc}$, applied transversely, i.e., at right angles to the direction of propagation of wave energy in guides 10 and 13 and at right angles to wide walls 11 and 12. It may be supplied by a solenoid structure comprising a C-shaped magnetic core having pole pieces bearing above and below guides 10 and 13 upon which turns of wire are wound and connected to a source of potential. This field may, however, be supplied by an electrical solenoid with metallic core of other suitable physical design, by a solenoid without a core, by a permanent magnet structure, or the ferromagnetic material of disc 16 may be permanently magnetized if desired.

Before proceeding further with a detailed examination of the preferred mode of operation of the circulator of Fig. 1 and the several adjustments necessary to obtain this operation, the unusual properties of a ferromagnetic coupling element, including within the term "coupling element" both the ferromagnetic disc 16 and its associated aperture, as it serves to couple magnetic field components between guide 10 and guide 13, must be thoroughly understood. Thus, when microwave energy is applied to guide 13 by way of terminal $a$ a standing wave is set up between piston 14 and iris 15. This wave includes a magnetic field represented by loops 17 and 18 at a particular instant of time that lie in planes parallel to the wide dimension of guide 13. Similarly, the electric field is represented by the vector E. Since the wave is a standing wave, the electric field has a maximum at the center of the magnetic loops. Therefore, at the location of element 16 there is a transverse electric field, a longitudinal magnetic field and no transverse magnetic field.

The performance of element 16 under these conditions can be explained by the recognition that the ferromagnetic material of element 16 contains unpaired electron spins which tend to line up with the applied magnetic field. These spins have an associated magnetic moment which can be made to precess about the line of the biasing magnetic field keeping an essentially constant moment component in the direction of the applied biasing field but providing a moment component which may rotate in a plane normal to the field direction. Thus, when a reciprocating high frequency magnetic field of electromagnetic wave energy is impressed upon the moment, the moment will commence to precess in one angular sense and to resist rotation in the opposite sense. The combined effect of many such electrons and their associated moments produces in the ferromagnetic material not only a flux representing the impressed magnetic field, but also a flux representing a reciprocating field at right angles in space and delayed by 90 degrees in time from the applied field. The effective field produced by the induced flux may be thought of as an induced field in guide 10 and represented by a vector labeled H' at right angles to and 90 degrees from the inducing magnetic component. The intensity of the induced magnetic field H' depends upon the strength of the applied magnetizing field.

There will also be a directly coupled electric field and a directly coupled longitudinal magnetic field. Since element 16 is located on the center line of guide 10 where no longitudinal magnetic field components exist, the directly coupled magnetic component has no effect. The directly coupled electric component will appear in guide 10 as represented by E'.

When the components H' and E' are of proper amplitude, they are in such phase that they combine as a wave propagating only toward terminal $b$ of guide 10. This may be seen by considering E' as the radiation from an electric dipole in guide 10. Defining the excited waves radiating in opposite directions in guide 10 therefrom as being relatively in phase, and then considering H' as the radiation from a magnetic dipole in guide 10, it will excite waves radiating in opposite directions that are relatively out of phase. Therefore the electrically excited wave cancels the magnetically excited wave upon propagation toward terminal $c$ and combines with the magnetically excited wave for propagation toward terminal $b$. A phase delay of 90 degrees which is inherent in any coupling through an aperture has been disregarded inasmuch as it would affect all components alike. Since the amplitude of the component E' in guide 10 depends upon the transverse position of element 16 on wall 12 and the amplitude of the component H' depends primarily upon the strength of the magnetizing field, the strength of this field is selected with respect to the location of element 16 so that the waves induced by components E' and H' are equal. In a typical embodiment in which element 16 is displaced away from the center line by one-fifth of the wide dimension of the guides, the strength of the magnetizing field required is substantially that required to saturate the ferromagnetic material of element 16. This field is substantially below that required to produce ferromagnetic resonance in the material.

Thus, microwave energy applied to guide 13 by way of terminal $a$ will appear at terminal $b$ of guide 10. If, on the other hand, energy is applied to terminal $b$, it will at some instant of time have electric and magnetic field components at element 16 that may be also represented by the vectors H' and E'. An electric field will be coupled into guide 13 having the same relative phase as E since the electric coupling is completely reciprocal. Transverse magnetic field H' in guide 10 will be coupled by element 16 as a longitudinal magnetic field in guide 13. Because of the constant direction of precession of the electrons within element 16, the phase of the coupled component will lag H' by 90 degrees which itself represents a phase 90 degrees behind that represented by loop 18. Thus, the induced component will have a phase that is opposite to that represented by loop 18 and the component wave which this magnetic field is capable of exciting will cancel with that wave which tends to be excited by the coupled electric field. Thus, no energy will be coupled into guide 13 and all energy applied to terminal $b$ of guide 10 will appear at terminal $c$ thereof. Energy, however, applied to terminal $c$ will induce electric field and magnetic field components that combine as a standing wave in guide 13. As may be shown by an analysis of thermal equilibrium in the structure, this coupled component will automatically comprise the entire energy in guide 10 when the dimension of iris 15 is adjusted for complete power transfer from terminal $a$ to terminal $b$. The coupling characteristic typical of a circulator circuit is thereby obtained.

An alternative of the embodiment of the circulator of Fig. 1 is represented by Fig. 2 in which guide 10 of Fig. 1 is replaced by guide 20 oriented with its longitudinal axis perpendicular to the longitudinal axis of guide 13. Coupling element 21, in all respects identical to element 16 of Fig. 1, is disposed on the center line of guide 13 at a point removed from piston 14 by more than one-quarter wavelength but slightly less than one-half wavelength. The wide dimension of guide 20 is centered upon element 21. While in Fig. 1 guide 10 was excited by a transverse magnetic field component coupled to it by element 16 from a longitudinal magnetic field component in guide 13, the present embodiment depends for its operation upon a coupling of a transverse magnetic field component from guide 13 to a transverse component in guide 20. In other respects, the operation of the circulator of Fig. 2 is substantially identical to that described for Fig. 1. To indicate this, the left and right ends of guide 20 are labeled $b$ and $c$, respectively, and the open end of guide 13 is labeled $a$. Circulator action takes place between the terminals in the order $a$, $b$ and $c$ for an external polarizing magnetic field directed into the paper as represented by the symbol 22.

In all cases it is understood that the above-described arrangements are simply illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A three port circulator for electromagnetic wave energy comprising a pair of conductively bounded structures supportive of electromagnetic wave energy at a given operating frequency having electric and magnetic field components, the first of said structures being capable of propagating said wave energy in respectively opposite longitudinal directions, the second of said structures comprising a resonant cavity tuned to said given operating frequency and supportive of a standing wave pattern wherein said electric and said magnetic field components are fixed in space with respect to said second structure, said structures sharing a common conductive wall and being oriented with respect to each other to establish a region along said wall where the magnetic field component in said region in said first structure is predominantly of a single polarization having a direction substantially perpendicular to the direction of the magnetic field component in said region in said second structure that is also predominantly of a single polarization, and where simultaneously the electric fields in said structures extend in respectively parallel directions, means for coupling electromagnetic wave energy from said electric field and from said magnetic field component in said second structure to said first structure including an aperture located in said region of said common wall and an element of magnetically polarizable material exhibiting gyromagnetic effects at said operating frequency physically associated and electrically cooperating with said aperture, and means for applying a magnetizing field to said element having an intensity and direction to make said electromagnetic wave energy coupled into said first structure by said electric field in said second structure, and said electromagnetic wave energy coupled into said first structure by said magnetic field component in said second structure equal in amplitude and opposite in phase for one direction of propagation in said first structure.

2. In combination, first and second conductively bounded wave guide structures of rectangular transverse cross section supportive of electromagnetic wave energy of a given frequency, said guides being disposed with their longitudinal axes parallel and a portion of their broad walls in contiguous relationship, a short circuit terminating one of said guides and a microwave iris spaced longitudinally from said short circuit along said one guide a distance to produce a resonant cavity supportive of a standing wave at said given frequency having electric and magnetic field components, means for coupling said guides comprising an element of magnetically polarized material exhibiting gyromagnetic effects at said given frequency physically associated and electrically cooperating with an aperture extending through said contiguous wall portion at a point where the said standing wave in said one guide has a substantial electric field intensity and a predominantly longitudinal magnetic field component, said aperture being located in said other guide on the longitudinal center line thereof.

3. In combination, first and second conductively bounded wave guide structures of rectangular transverse cross section supportive of electromagnetic wave energy of a given frequency, said guides being disposed with their longitudinal axes perpendicular and a portion of their broad walls in contiguous relationship, a short circuit terminating one of said guides and a microwave iris spaced from said short circuit in said one guide a distance to produce a resonant cavity supportive of a standing wave at said given frequency having electric and magnetic field components, and means for coupling said guides comprising an element of magnetically polarized material exhibiting gyromagnetic effects at said given frequency physically associated and electrically cooperating with an aperture extending through said contiguous wall portion at a point on the longitudinal center line of said one guide and at a distance from said short circuit for which said standing wave therein has substantial electric field intensity and a predominantly transverse magnetic field component, said aperture also being located on the longitudinal center line of the other of said guides.

References Cited in the file of this patent

UNITED STATES PATENTS

| 2,849,683 | Miller | Aug. 26, 1958 |
| 2,849,687 | Miller | Aug. 26, 1958 |

FOREIGN PATENTS

| 980,648 | France | Dec. 27, 1950 |
| 64,770 | France (Addition) | June 29, 1955 |
| 755,174 | Great Britain | Aug. 15, 1956 |

OTHER REFERENCES

Damon: "Magnetically Controlled Microwave Directional Coupler," Journal of Applied Physics, vol. 26, No. 10, October 1955, pages 1281–1283.

Berk et al.: Proceedings of the IRE, vol. 44, No. 10, October 1956, pages 1439–1445.